United States Patent Office 3,217,048
Patented Nov. 9, 1965

3,217,048
CHLOROMETHYLATION OF DICHLOROBENZENES
David L. Garmaise, Montreal, Quebec, Arthur F. McKay, Beaconsfield, Quebec, and Gerard Y. Paris, La Salle, Quebec, Canada, assignors to Monsanto Canada Limited, La Salle, Quebec, Canada
No Drawing. Filed Oct. 11, 1961, Ser. No. 144,299
5 Claims. (Cl. 260—651)

This invention relates to improvements in the chloromethylation of o-dichlorobenzene and p-dichlorobenzene.

An object of the invention is to provide an economical and easily operated process for the chloromethylation of the aforementioned dichlorobenzenes.

Another object of this invention is to provide a process for the chloromethylation of o-dichlorobenzene and p-dichlorobenzene resulting in novel yields of 3,4-dichlorobenzyl chloride and 2,5-dichlorobenzyl chloride.

A process for the chloromethylation of o-dichlorobenzene is described by M. Kulka in the Journal of American Chemical Society 72, 1215 (1950). This process involves treatment of a mixture of o-dichlorobenzene, zinc chloride and trioxymethylene with dry hydrogen chloride gas. This procedure gave only a crude yield of 22% 3,4-dichlorobenzyl chloride. In the Canadian Journal of Chemistry 33, 1134 (1955) Kulka and van Stryp describe the reaction of oleum, p-dichlorobenzene and crude methyl chloromethyl ether. This process gave a yield less than 15% 2,5-dichlorobenzyl chloride.

It has now been found that o-dichlorobenzene or p-dichlorobenzene can be chloromethylated in a manner that will give yields of 3,4-dichlorobenzyl chloride and 2,5-dichlorobenzyl chloride of up to 70% or more.

The improved process for chloromethylation of the dichlorobenzene in this invention is a single step process comprising reacting at a temperature within the range of about 0° C. to about 90° C., o- or p-dichlorobenzene with concentrated sulfuric acid, paraformaldehyde and hydrogen chloride. The upper organic layer formed from the reaction is then separated and the desired product isolated by fractional distillation.

In carrying out the process of the invention the molar ratio of formaldehyde to the dichlorobenzene varies from 1:1 to about 3:1. Excellent results are obtained with the use of a molar ratio of 2:1.

At least 3 moles of sulphuric acid to 1 mole of o- or p-dichlorobenzene is used to promote maximum yields of chloromethylated products of this invention. Optimum yields are obtained with from about 6 to about 8 molar equivalents of sulphuric acid. The strength of the sulphuric acid used in this invention varies from about 90% $H_2SO_4$ to about 20% oleum. It is preferred to use from about 95 to about 97% $H_2SO_4$. The rate of reaction is prohibitively slow at lower strengths. At higher strengths the product yield is reduced due to increased secondary reactions.

An important feature in the process of this invention is the preparation of the necessary intermediate bis (chloromethyl) ether by the action of hydrogen chloride on a formaldehyde-sulphuric acid solution, which contains sufficient sulphuric acid to also catalyze the subsequent chloromethylation. The hydrogen chloride can be introduced into the reaction as a gas by means of bubbling it into the formaldehyde-sulphuric acid solution. It may also be made available in the reaction by means of a chloride salt as the source of hydrogen chloride. For convenience and economic reasons it may be preferable to use the chloride salt.

Numerous chloride salts, for example, chlorides of ammonia and various alkali and alkaline earth metal chlorides have been tried as the source of hydrogen chloride in the chloromethylation of o- or p-dichlorobenzene. Such reactions cause the formation of bis (chloromethyl) ether and of inorganic sulfates as by-products which substantially inhibit the chloromethylation reaction. It has now been discovered that a specific chloride namely, calcium chloride, can be used in the accomplishment of this invention. Calcium chloride is particularly useful in that the by-product calcium sulfate will not interfere with the subsequent chloromethylation reaction. A further advantage in the use of calcium chloride is its low cost.

The molar ratio of the calcium chloride to the formaldehyde is 1:2. Said chloride is introduced into the reaction preferably at a temperature of from about 0° to about 25° C. Care is taken at the higher temperatures to avoid loss of the hydrogen chloride. On addition of the chloride the mixture is stirred for approximately 30 minutes. As the reaction proceeds bis (chloromethyl) ether is formed.

The o-dichlorobenzene or p-dichlorobenzene can be added at any stage of the process with no ill effect to the reaction. After the formation of said ether is substantially complete the reaction temperature can be adjusted to any temperature between about 0° and about 90° C.

The time of reaction will depend on the use of the variables as above defined. An optimum yield has been obtained in a reaction time of five hours with the use of 95% sulphuric acid, formaldehyde, calcium chloride and o-dichlorobenzene in a molar ratio of 6.5:2:1:1 and at a temperature of 70 to 72° C.

In the chloromethylation of o-dichlorobenzene the resulting product of the invention is 3,4-dichlorobenzyl chloride with a minor amount of 2,3-dichlorobenzyl chloride.

The following examples illustrate this invention, all parts being parts by weight.

*Example I*

Calcium chloride dihydrate (22.0 parts) is added during 15 minutes to a stirred solution of 95% paraformaldehyde (9.53 parts) in a mixture of 95% sulfuric acid (92.6 parts) and 20% oleum (17.4 parts) at 5° C. o-Dichlorobenzene (22.0 parts) is added and the temperature is maintained at 20° C. for 30 minutes. The mixture is stirred at 70–72° for 5 hours, and is then cooled to room temperature. The upper layer is separated and fractionally distilled giving unchanged o-dichlorobenzene B.P. 70–74°/14 mm. (1.0 part, 4.5% recovery), 3,4-dichlorobenzyl chloride B.P. 130–132°/14 mm. (20.5 parts, 70.0% yield) and a high boiling residue (5.9 parts).

*Example II*

Calcium chlorine dihydrate (22.0 parts) is added during 15 minutes to a stirred solution of 95% paraformaldehyde (9.53 parts) in 95% sulfuric acid (110 parts) at 5° C. o-Dichlorobenzene (22.0 parts) is added and the temperature maintained at 20° C. for 30 minutes. The mixture is stirred at 90° for 4 hours. The organic layer is fractionated as in Example I, giving o-dichlorobenzene (3.0 parts, 13.5% recovery), 3,4-dichlorobenzyl chloride (148 parts, 50.4% yield) and high boiling residue (8.0 parts).

*Example III*

Calcium chloride dihydrate (22.0 parts) is added during 15 minutes to a stirred solution of 95% paraformaldehyde (9.53 parts) in a mixture of 95% sulfuric acid (51.4 parts) and 20% oleum (58.6 parts) at 5° C. o-Dichlorobenzene (22.0 parts) is added, and the temperature maintained at 20° C. for 30 minutes. The mixture is stirred at 50° for 4 hours. The organic layer is fractionated as in Example I to give o-dichlorobenzene (3.1 parts, 14.1% recovery), 3,4-dichlorobenzyl chloride (17.3 parts, 59.2% yield) and high boiling residue (6.5 parts).

*Example IV*

Anhydrous calcium chloride (11.1 parts) is added during 15 minutes to a stirred solution of 95% paraformaldehyde (6.35 parts) in 95% sulfuric acid (110 parts) at 10° C. The temperature is maintained at 20° for 30 minutes. Dichlorobenzene (22.1 parts) is added, and the mixture stirred at 70–72° for 2 hours. The organic layer is separated and fractionally distilled giving o-dichlorobenzene (1.7 parts, 7.7% recovery) 3,4-dichlorobenzyl chloride (14.9 parts, 51% yield) and high boiling residue (8.1 parts).

*Example V*

Anhydrous hydrogen chloride is bubbled into a stirred solution of 95% paraformaldehyde (9.5 parts) in 90% sulfuric acid (95 parts) at 15–20° for one hour. o-Dichlorobenzene (22.1 parts) is added, and the mixture stirred at 60° for 5 hours. The upper layer is separated and fractionally distilled giving unchanged o-dichlorobenzene (2.7 parts 12.0% recovery), 3,4-dichlorobenzyl chloride (18.1 parts, 61.8% yield) and high boiling residue (5.3 parts).

*Example VI*

Calcium chloride dihydrate (22.0 parts) is added during 15 minutes to a stirred solution of 95% paraformaldehyde (9.53 parts) in a mixture of 95% sulfuric acid (51.4 parts) and 20% oleum (58.6 parts) at 5° C. p-Dichlorobenzene (22.1 parts) is added, and the mixture stirred at 20° for 30 minutes. The reaction mixture is then heated at 60° for 5 hours. The upper layer is separated and fractionally distilled giving unchanged p-dichlorobenzene B.P. 80–90°/25 mm. (2.9 parts, 13.3% recovery), 2,5-dichlorobenzyl chloride, B.P. 121–124°/14 mm. (15.6 parts, 53.3% yield) and high boiling residue (7.5 parts).

*Example VII*

Calcium chloride dihydrate (29.4 parts) is added during 15 minutes to a stirred solution of 95% paraformaldehyde (12.7 parts) in a mixture of 95% of sulfuric acid and 20% oleum (52 parts) at 5° C. o-Dichlorobenzene (22.05 parts) is added, and the mixture stirred at 20° for 30 minutes. The reaction mixture is then heated at 70° for 4 hours. The upper layer is separated and fractionally distilled giving unchanged o-dichlorobenzene (4.3 parts, 19.3% recovery), 3,4-dichlorobenzyl chloride (17.7 parts, 60.4% yield) and high boiling residue (6.49 parts).

*Example VIII*

Calcium chloride dihydrate (22.05 parts) is added during 15 minutes to a stirred solution of 95% paraformaldehyde (9.53 parts) in a mixture of 95% sulfuric acid (101.3 parts) and 20% oleum (8.7 parts), at 5° C. o-Dichlorobenzene (22.05 parts) is added and the temperature maintained at 20° C. for 30 minutes. The mixture is then stirred at 80–82° C. for 4 hours. After cooling to room temperature, the upper layer is separated and fractionally distilled giving unchanged o-dichlorobenzene (2.1 parts, 9.7% recovery), 3,4-dichlorobenzyl chloride (19.7 parts, 67.4% yield) and high boiling residue (6.52 parts).

*Example IX*

Calcium chloride dihydrate (22.1 parts) is added during 15 minutes to a stirred solution of 95% paraformaldehyde (9.53 parts) in a mixture of 95% sulfuric acid (29 parts) and 20% oleum (81 parts) at 5° C. o-Dichlorobenzene (22.1 parts) is added and the temperature is then maintained at 20° C. for 30 minutes. The mixture is then stirred at 40–42° C. for 5 hours. The upper layer is separated and fractionally distilled giving 3,4-dichlorobenzyl chloride (15.6 parts, 53.3% yield) and high boiling residue (10.8 parts).

*Example X*

Calcium chloride dihydrate (22.1 parts) is added during 15 minutes to a stirred solution of 95% paraformaldehyde (9.53 parts) in 20% oleum (110 parts) at 5° C. o-Dichlorobenzene (22.1 parts) is added and the temperature is maintained at 20° C. for 30 minutes. The mixture is then stirred at 25–30° C. for 10 hours. The upper layer is separated and fractionally distilled giving 3,4-dichlorobenzyl chloride (15.5 parts, 53% yield) and high boiling residue (12.6 parts).

*Example XI*

Calcium chloride dihydrate (22.1 parts) is added during 15 minutes to a stirred solution of 95% paraformaldehyde (9.53 parts) in 20% oleum (110 parts) at 5° C. o-Dichlorobenzene (22.1 parts) is added and the temperature maintained at 20° C. for 30 minutes. The mixture is then stirred at 2–6° C. for 13½ hours. The upper layer is separated and fractionally distilled giving unchanged o-dichlorobenzene (0.7 part, 0.3% recovery), 3,4-dichlorobenzyl chloride (16.5 parts, 56.3% yield) and high boiling residue (8.15 parts).

*Example XII*

Calcium chloride dihydrate (11.03 parts) is added during 15 minutes to a stirred solution of 95% paraformaldehyde (4.57 parts) in a mixture of 95% sulfuric acid (34.6 parts) and 20% oleum (11.4 parts) at 5° C. o-Dichlorobenzene (22.1 parts) is added and the temperature maintained at 20° C. for 30 minutes. The mixture is then stirred at 70–72° C. for 10 hours. After cooling to room temperature the upper layer is separated and fractionally distilled giving unchanged o-dichlorobenzene (6.3 parts, 28.5%), 3,4-dichlorobenzyl chloride (10.7 parts, 36.5%) and high boiling residue (5.0 parts).

*Example XIII*

Calcium chloride dihydrate (33.08 parts) is added during 15 minutes to a stirred solution of 95% paraformaldehyde (13.57 parts) in a mixture of 95% sulfuric acid (93.5 parts) and 20% oleum (28.5 parts) at 5° C. o-Dichlorobenzene (22.1 parts) is added and the temperature is maintained at 20° C. for 30 minutes. The mixture is then stirred at 70–72° C. for 10 hours. The upper layer is separated and fractionally distilled giving 3,4-dichlorobenzyl chloride (16.4 parts, 56%) and high boiling residue (11.4 parts).

What is claimed is:

1. An improved process for the chloromethylation of a member of the group consisting of o-dichlorobenzene and p-dichlorobenzene which comprises reacting at a temperature within the range of about 0° C. to about 90° C. A reaction mixture consisting of 1 mole of said dichlorobenzene with at least 3 moles of concentrated sulfuric acid, about 1 to about 3 moles of paraformaldehyde, and calcium chloride in a ratio of 1 mole of calcium chloride to 2 moles of paraformaldehyde and recovering the chloromethylated product, one of a group consisting of 3,4-dichlorobenzyl chloride and 2,5-dichlorobenzyl chloride in high yield.

2. The process of claim 1 wherein the benzene reactant is o-dichlorobenzene.

3. The process of claim 1 wherein the benzene reactant is p-dichlorobenzene.

4. The process of claim 1 wherein the acid is at least 90% concentrated sulfuric acid.

5. The process of claim 1 wherein the acid is 95 to 97% concentrated sulfuric acid.

References Cited by the Examiner

UNITED STATES PATENTS 2,973,391   2/61   Earhart et al. _____ 260—651

FOREIGN PATENTS 492,021   2/19   France.
865,896   2/53   Germany.

OTHER REFERENCES

Adams et al.: "Organic Reactions," vol. 1, page 71.

LEON ZITVER, *Primary Examiner.*

ALPHONSO D. SULLIVAN, *Examiner.*